US007328282B2

(12) United States Patent
Ganesan et al.

(10) Patent No.: US 7,328,282 B2
(45) Date of Patent: Feb. 5, 2008

(54) ASPECT ORIENTED WEB SERVICE INVOCATION

(75) Inventors: Kumaravel Ganesan, Tamil Nadu (IN); Karthikeyan Ponnalagu, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/691,920

(22) Filed: Oct. 23, 2003

(65) Prior Publication Data

US 2005/0091374 A1 Apr. 28, 2005

(51) Int. Cl.
*G06F 15/16* (2006.01)

(52) U.S. Cl. .................... 709/246; 709/245; 709/202; 709/203

(58) Field of Classification Search .............. 709/245, 709/246, 202, 203
See application file for complete search history.

(56) References Cited

U.S. PATENT DOCUMENTS

| 6,442,750 | B1 | 8/2002 | Lopes et al. | |
|---|---|---|---|---|
| 7,178,163 | B2 * | 2/2007 | Reeves, Jr. .................... | 726/2 |
| 2003/0163450 | A1 * | 8/2003 | Borenstein et al. ............ | 707/1 |
| 2004/0030627 | A1 * | 2/2004 | Sedukhin ..................... | 705/36 |
| 2004/0039738 | A1 * | 2/2004 | Cutlip .......................... | 707/5 |

OTHER PUBLICATIONS

Web Services Description Language (WSDL), Version 1.2, Working Draft of Jan. 24, 2003 is available at http://www.w3.org.TR/wsdl12.
Using WSDL in a UDDI Registry, Version 1.07 (UDDI Best Practice), in the section titled "Relevant UDDI Structures" of May 21, 2002, published by UDDI.org, and available from www.uddi.org/pubs/wsdlbestpractices.html.
A Service Level Agreement Language for Dynamic Electronic Services, by Heiko Ludwig, Alexander Keller, Asit Dan and Richard King, dated Jan. 24, 2002, available from IBM T.J. Watson Research Center, Yorktown, NY 10598 (also is available from http://www.research.ibm.com/wsla/WSLA093.xsd).
Java™ Virtual Machine Debug Interface Reference, published by Sun Microsystems, Inc. in 1998, (and available at http://java.sun.com/j2se/1.3.guide.jpda.jvmdi-spec.html).
Dynamic Weaving for Aspect-Orientated Programming, by Andrei Popovici, Thomas Gross and Gustavo Alonso, ETH Zürich, Switzerland, 2002.

* cited by examiner

*Primary Examiner*—Jason Cardone
*Assistant Examiner*—Nicholas R Taylor
(74) *Attorney, Agent, or Firm*—Anthony V. S. England; William Steinberg

(57) ABSTRACT

A web service request is received by an intermediary that performs a conversion of the requestor's service interface to the service interface supported by a service provider matching the requested service, then invokes that service. A reverse conversion is performed when passing a reply to the requester. The web serving intermediary maintains a library of each target service in terms of the target service's tModel and on its binding protocol support. The intermediary receives web service requests from requestors including their source tModel and target web service information. The intermediary identifies a mapping aspect to invoke the target web service from the aspect library. The target service tModel is embodied in the mapping aspect which is weaved into the code invoking the target service at runtime. In this way, the interface logic is decided at run time.

10 Claims, 5 Drawing Sheets

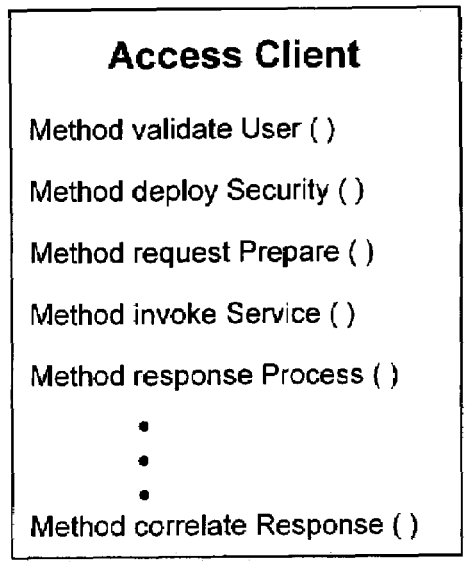

Fig. 4

```
aspect RequestMapping{
  pointcut modelMap():
         call(void AccessClient.requestPrepare(param));
  before(): modelMap(){
    System.out.println("Entering: " + thisJoinPoint);

// Mapping logic
Tmodel3.InventoryCheck = Tmodel5.CheckAvailability
Tmodel3.InventoryRequest = Tmodel5.CheckAvailabilityRequest
Tmodel3.InventoryResponse = Tmodel5.CheckAvailabilityResult }
}
*****************************************************
aspect ResponseMapping{ pointcut reverseModelMap():
         call(Param AccessClient.responseProcess());
  after(): reverseModelMap(){
    System.out.println("Entering: " + thisJoinPoint);

// Mapping logic
Tmodel5.CheckAvialbility =Tmodel3.InventoryCheck
Tmodel5.CheckAvialbilityRequest =Tmodel3.InventoryRequest
Tmodel5.CheckAvialbilityResult =Tmodel3.InventoryResponse
  }
}
```

Fig. 5

ASPECT ORIENTED WEB SERVICE INVOCATION

FIELD OF THE INVENTION

The invention relates to the field of web serving, and particularly invocation of web services. In one form, this is achieved by use of an aspect oriented framework.

BACKGROUND

In general service-oriented web serving architectures there are essentially three roles: service providers, service accessing clients, and registry/mediatory. Any person with a computing node with appropriate software and connection abilities can access a web service. More typically it will be a web service in a business external integration environment, in which an enterprise application can invoke and run external business processes hosted by service providers as web services. To enable effective managing of invocation, most of these clients employ a web service intermediary layer such as simple proxy framework (e.g. WSIF or web service gateways), that cater for different transport protocols. The service providers may describe their service using standards such as the Web Services Description Language (WSDL), which is an XML-based language, that defines web service interface details. A description of *Web Services Description Language (WSDL) Version* 1.2, Working Draft of 24 Jan. 2003 is available at http://www.w3.org.TR/wsdl12. The standard is published by the Worldwide Web Consortium.

Generally, web service abstracts the client from the underlying hardware, operating system, implementing language, hosting servers, and so on. However, from the client point of view, invoking a service defined by a different interface standard or invoking a service with changed interface requires an understanding of the request/response messages and reformatting the request data to access the changed service. Thus in spite of the automation and abstraction that comes with interacting with a web service, the client still needs to undertake code changes to invoke the new or changed service. This is disadvantageous from the point of view of cost and down time.

A modular approach can be taken to this problem. By taking a modular approach, the various modules of the requesting client can access different port-types of the hosted service implementation defined by an interface. However this approach fails in situations such as binding protocol support, Quality of Service (QOS) restrictions, and interface adaptation.

What is clearly needed is a mechanism that enable a proxy or any other service-specific intermediary to serve clients so that they interact with different service interfaces and service bindings at run time, and are relieved of the service invocation and dealing with interaction level changes. It is desirable also to provide a mechanism that takes care of specific invocation details described in standards such as WSDL, and to provide a mechanism that is self-configured with capabilities to adjust to the properties of the service during the point of invocation.

SUMMARY

A web service request is received by an intermediary that performs a conversion of the requestor's service interface to the service interface supported by a service provider matching the requested service, then invokes that service. A reverse conversion is performed when passing a reply to the requestor.

The service interface can exist in accordance with the Universal Description Discovery and Integration (UDDI) specification. The UDDI specification utilises tModels, that provide the ability to describe services and taxonomies. Services represented in UDDI are provided by one or more nested binding template structures.

The web serving intermediary maintains a library of each target service in terms of the target service's tModel and on its binding protocol support. The intermediary receives web service requests from requestors including their source tModel and target web service information. The intermediary identifies a mapping aspect to invoke the target web service from the aspect library. The target service tModel is embodied in the mapping aspect which is weaved into the code invoking the target service at runtime. In this way, the interface logic is decided at run time.

DESCRIPTION OF DRAWINGS

In the drawings:

FIG. 4 is a representative structure of the access client component of the framework of FIG. 3.

FIG. 5 is a code listing for an aspect that identifies the point cuts of the aspect client.

DETAILED DESCRIPTION

Introduction

Figure 1:
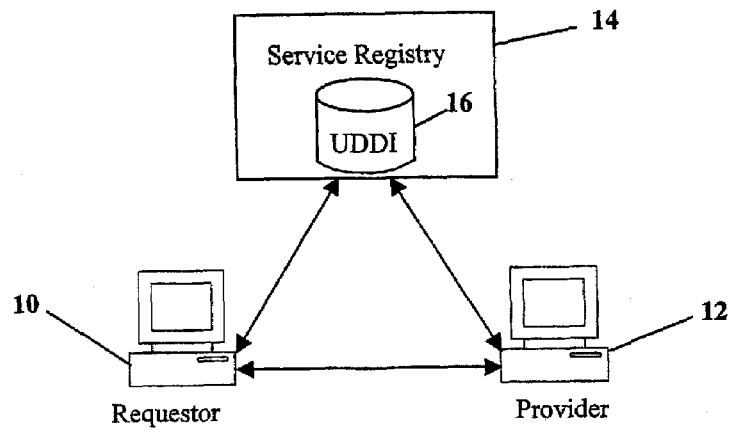
FIG. 1 is a block diagram of a web serving architecture.

As noted above, and with reference to FIG. 1, in a typical service oriented architecture for web services, there are three major entities involved. They are a service requestor 10, a service provider 12, and a service registry 14 (also known as a web service intermediary). The service requestor 10 and service registry 14 are running WSDL. Of course this is a primitive example for purposes of explanation; there will be many requestors, providers and registries in actual use.

The service provider 12 publishes the description of the service it provides into a Universal Description Discovery and Integration (UDDI) registry 16. The UDDI registry 16 resembles an Internet search engine, that helps in discovering web services. The services description information defined in WSDL is complementary to the information found in a UDDI registry. The service provider 12 can either provide the service interface referred by the published service or it can refer to any standard service interface already published in the UDDI registry 16. As briefly mentioned above, in the UDDI's terms, a service interface is called a "tModel" and the service implementation is called a "binding template". A discussion of these UDDI structures is given in a document titled: Using WSDL in a UDDI Registry, Version 1.07 (UDDI Best Practice), in the section titled "Relevant UDDI Structures" of May 21, 2002, published by UDDI.org, incorporated herein by reference, and available from www.uddi.org/pubs/wsdlbestpractices.html.

In general terms, the service requestor 10 discovers the appropriate service from service implementation documents published in the UDDI registry 16 based on its requirements, and binds to the respective service provider 12. Binding involves accessing the service using the information such as end point, messaging protocol and the messaging style provided in the service implementation document stored in the UDDI registry 16. The service implementation document contains details such as the IP address called to reach the service, and the messaging protocol that the service uses to listen to requests.

Figure 2:
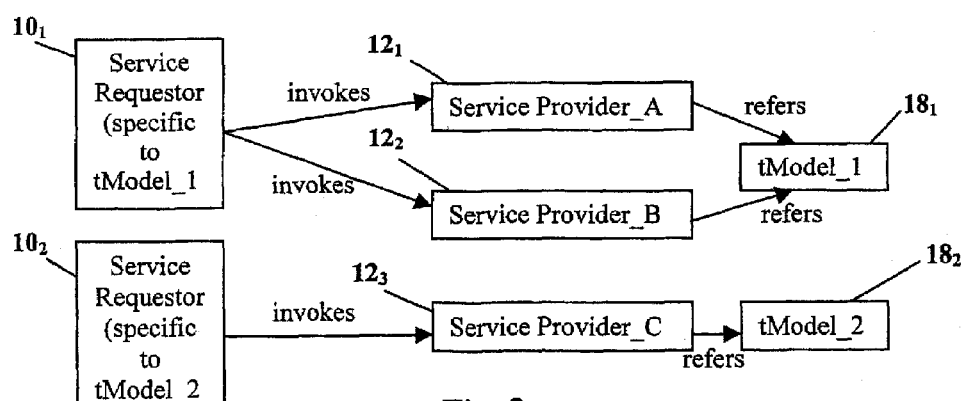
FIG. 2 is an interaction diagram for a known service implementation.

FIG. 2 depicts a web service-invoking client 10 in a known scenario. Here, the binding and invocation logic specific to the web service interface is embedded within the business logic of the requester code. A first service requestor $10_1$ has interface logic specific to tModel_1, allowing it to invoke either of service provider A $12_1$ or service provider B $12_2$, that refer to tModel_1 $18_1$. A second service requestor $10_2$ has interface logic specific to tModel_2, and can invoke only service-provider C $12_3$, that refers to tModel_2 $18_2$. For either service requester $10_1$, $10_2$ to invoke the other service, its interfacing logic is required to be modified, which is undesirable.

As already mentioned, the standard interface definitions are registered as tModels in the UDDI 16. The service providers can publish their compliance with these standard definitions by referring to them in the respective binding template. Each tModel has a name, an explanatory description, and a Universal Unique Identifier (UUID). The UUID points to the service interface description wsdl code, which includes the port type, operations and request/response messages.

A sample tModel definition is given below:

```
<tModel authorizedName="..." operator="..." tModelKey="...">
    <name>HertzReserveService</name>
    <description xml:lang="en">WSDL description of the Hertz ™
reservation service interface</description>
    <overviewDoc>
        <description xml:lang="en">WSDL source document.</description>
<overviewURL>http://mach3.ebphost.net/wsdl/hertz_reserve.wsdl
</overviewURL>
    </overviewDoc>
    <categoryBag>
        <keyedReference tModelKey="uuid:C1ACF26D-9672-4404-9D70-
39B756E62AB4" keyName="uddi-org:types" keyValue="wsdlSpec"/>
    </categoryBag>
</tModel>
```

In a typical scenario, as explained with reference to FIG. 2, a requesting client 10, that is specific to a service definition tModel, can interact with only the service implementations that are compliant with this tModel.

Framework Solution

The framework which addresses this problem performs tModel adaptation dynamically at runtime. The framework resides on the service registry 14. Aspect dynamic weaving is the mechanism used to achieve this interface adaptive invocation of web services. This enables a requesting client to interact with multiple target services compliant to different tModel standards at runtime by invoking a single framework.

The requesting clients 10 need to specify to the registry 14 the framework standard that they are comply with and the target service that they wish to interact with, along with the request parameters, in a standard format specified by the framework.

Figure 3:
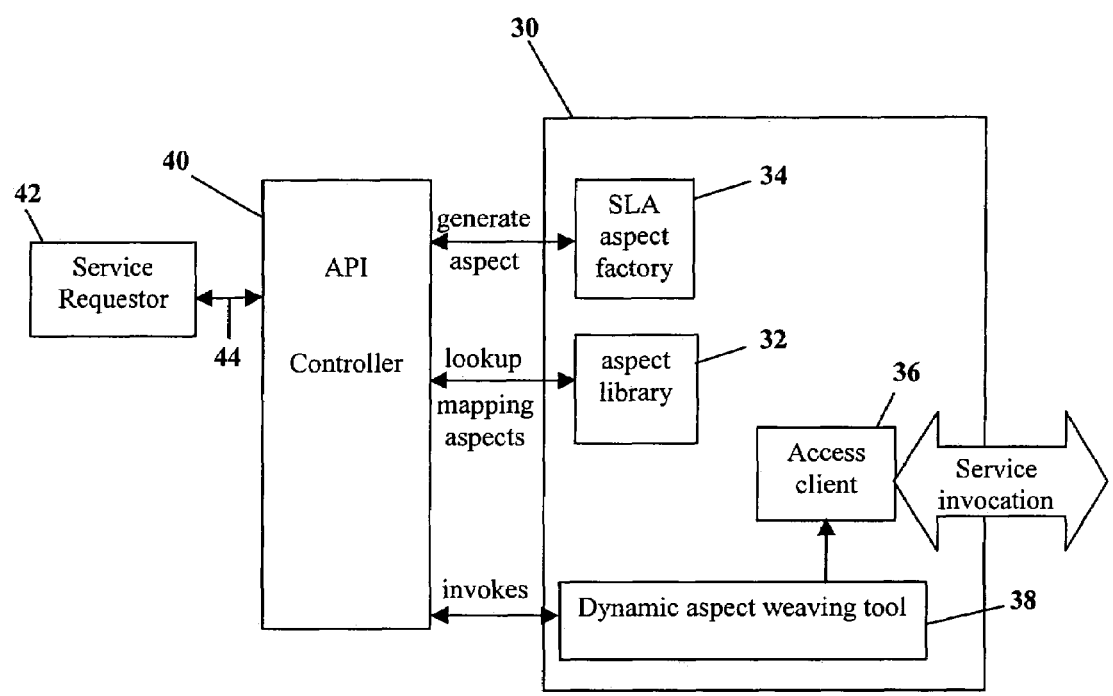
FIG. 3 is a block diagram of a service access framework architecture of the invention.

FIG. 3 shows the architecture of the framework 30, together with an associated API controller 40. The framework 30 and API controller 40 reside within the service registry 14. The framework 30 has an aspect library 32, a (Service Level Agreement) aspect factory 34, an access client 36, and a dynamic aspect weaving tool 38. The API controller 40, in turn, provides an interface with an application 42 being run on a service requester computer 10.

The API controller 40 links to the aspect factory 34 to generate aspects, and has a mapping aspect lookup function with the aspect library 32. The API controller 40 invokes the aspect weaving tool 38 to weave the identified mapping aspects and the SLA aspects into the access client. The link 44 between the API controller 40 and the service requestor application 42 handles messaging using WSDL or other such languages. Within the WSDL code typically will be a Web Service Level Agreement (WSLA), embodied as an XML schema. A description of a SLA is provided in: *A Service Level Agreement Language for Dynamic Electronic Services*, by Heiko Ludwig, Alexander Keller, Asit Dan and Richard King, dated Jan. 24, 2002, available from IBM T. J. Watson Research Center, Yorktown, N.Y. 10598 (also is available from http://www.research.ibm.com/wsla/WSLA093.xsd) incorporated herein by reference.

The aspect library 32 contains a collection of "mapping aspects". The definition of each aspect has a list of "pointcuts" and corresponding "advice" related to the "join point" of the access client 36. A "join point" is an instruction point in the code that can be modified by the aspect. A "pointcut" is a description of the execution contexts in which an aspect should be activated. "Advice" is the functionality logic provided by the aspect which acts upon the execution of the join point, before or after the execution.

The aspect factory 34 contains pre-defined aspect templates. During the runtime the aspect factory 34 generates the aspect instance which will contain the SLA parameter measurement logic which is based on the data received from the WSLA of the service to be invoked. The aspect factory 34 parses the SLA parameter-related details from the implementation definition and fills those details into an instance of the aspect template to be weaved into access client 36. An example of WSLA-related aspects is: the aspect which calculates the value of the SLA parameter during the runtime. An example of the SLA parameter is: response time, invocation count, status, etc.

FIG. 4 shows a sample structure of an access client component. The access client 36 has different modules (eg. "Methods") specific to the access-related requirements for interacting with any service, such as user validation and encryption requirements. The access client 36 encapsulates the functionality of sending an interface-specific request and retrieving the response from the relevant web service.

The mapping aspect, sourced from the aspect library 32, works for two dataflows when woven into the access client methods. In the request flow, the API controller 40 parses the request parameter of the source tModel and assigns the values to the attributes specified in the tModel target, and constructs a request message understandable by the target service. This constructed request message will be used by the access client 36 without any change in its existing code logic for invoking the service. In the response flow, the access client 36 gets the response message from the service. The API controller 40 employs a reverse mapping to get into the message into a form that complies with the source tModel.

FIG. 5 shows a pseudo-code listing for the mapping aspect that lists the pointcuts and advice for the aspect client.

"RequestMapping" lists the pointcut for the method "RequestPreparation( )" and the corresponding advice for the request mapping logic. "ResponseMapping" lists the pointcut for the method "ResponseProcess( )" and the corresponding advice for the ResponseMapping logic.

Runtime Flow

Figure 6:
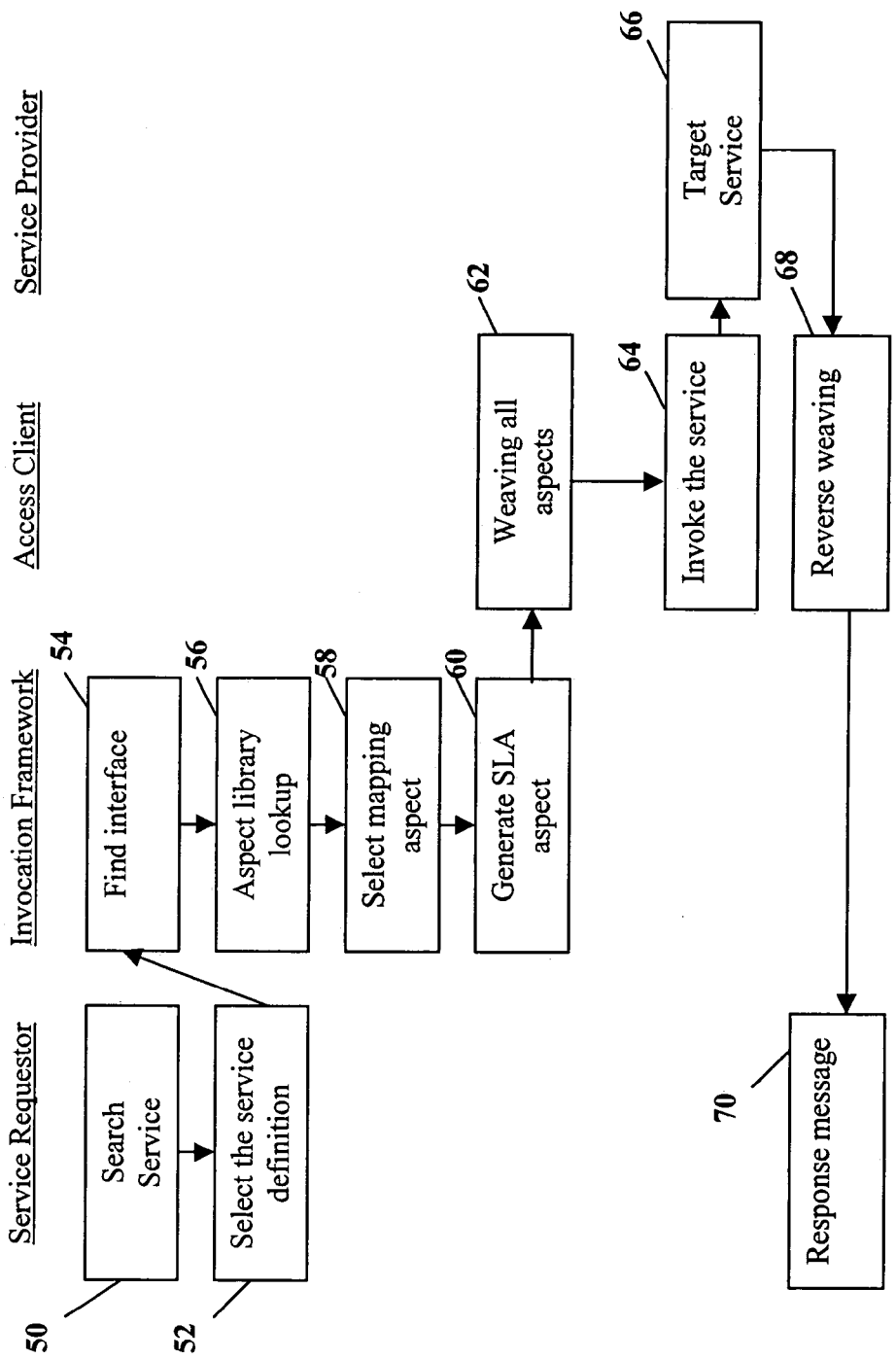
FIG. 6 is a runtime flow model.

FIG. 6 shows the runtime flow model. When interaction with a target web service is wanted (step 50), the requesting application 42 discovers the related service that satisfies its requirement (step 52). The discovery of the target service by the requesting client can be done using standard APIs, such as UDDI4j, which is an open-source Java implementation of the Universal Discovery, Description and Integration Protocol, a project supported by IBM and others, to retrieve the set of implementations available for a specific business request. The choice of a single service implementation is based on the business logic of the client. It could be as simple as choosing the first discovered service it needed, or more complex such as considering the service agreements that exist between the company of the requesting client and the exposed service.

The service requestor 42 next invokes the invocation framework 30 and supplies the description document of the service, along with the tModel it complies with and requesting information data. From the service implementation definition supplied, the referenced tModel containing the service interface definition document is retrieved (step 54) from the service provider-specified URL. Based on this set of information, lookup to the aspect library 32 will be done (step 56) and the corresponding mapping aspect (step 58) for request flow and response flow will be retrieved. The generation of the SLA aspect by the aspect factory 34 now occurs (step 60). The behavior of the mapping aspect and the SLA aspect is then forced into the (generic) access client 36 using dynamic weaving (step 62) before (and after) the invocation of the service.

In some instance no SLA requirements would be specified by the service requestor, meaning that step 60 may not be performed.

Figure 7:
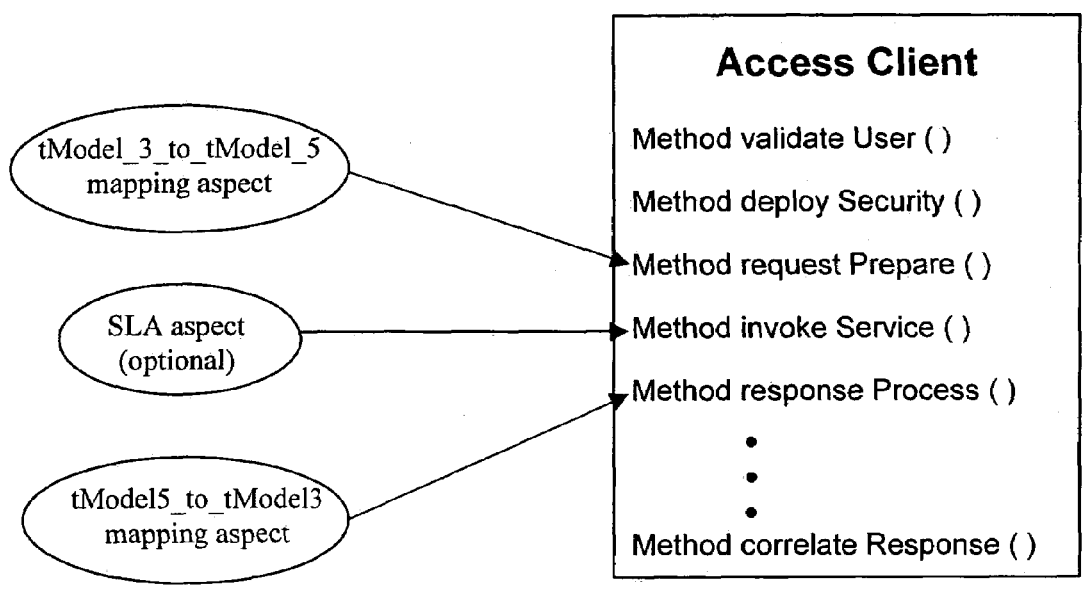
FIG. 7 is a process diagram showing a weaving of advices.

The outlined functionality of the mapping aspect provides an assignment of the service interface attributes defined in one tModel to the attributes of the tModel which is complied with by the target service. The advices will be weaved at the identified join points. For example, as shown in FIG. 7, the Method requestPrepare ( ) is woven with the tModel__3_to_tModel__5 mapping aspect, and Method responseProcess ( ) is woven with the tModel__5_to_tModel__3 mapping aspect. The SLA aspect is woven to the invoke Method service ( ), but shown as optional in the case no SLAs are specified.

So, at runtime, the mapping logic of the aspect is executed for the Method requestprepare ( ), that generates the request message which is in compliance with the target service. Referring again to FIG. 6, the access client 36 constructs the protocol-specific request from this message and invokes the service (step 64). If this service supports the request/response model of invocation, then the target service sends a response (step 66) which is again protocol-specific. On the access client 36 receiving this response, the response message specific to the service interface is constructed backwards. At this point, the dynamic weaving of the aspect for mapping to the source tModel specific parameters is executed (step 68). The framework the desired response message is then returned to the requesting client 42 (step 70).

Dynamic weaving

Dynamic weaving of aspects will be achieved by the weaving tool 38 using a framework such as "PROSE" (discussed below) that employs a Java Virtual Machine Debugger Interface (JVMDI). A discussion of JVMDI is found in a document titled *Java™ Virtual Machine Debug Interface Reference*, published by Sun Microsystems, Inc. in 1998, (and available at http://java.sun.com/j2se/1.3.guide-.jpda.jvmdi-spec.html) incorporated herein by reference. Using the JVMDI, PROSE can instruct the Java virtual machine to hand over the control of execution on reaching a specified Method (as an example) to weave the required aspects and execute as part of the target programming sequence.

PROSE

PROSE stands for PROgrammable Service Extensions. It was developed by the Information and Communication Systems Research Group of the Institute for Pervasive Computing, Department of Computer Science, ETH (Swiss Federal Institut of Technology) Zürich, Switzerland. A document describing PROSE is: *Dynamic Weaving for Aspect-Orientated Programming*, by Andrei Popovici, Thomas Gross and Gustavo Alonso of ETH Zürich, published in 2002, incorporated herein by reference. PROSE allows inserting aspects in running Java™ applications. PROSE is implemented as a JVM extension that can perform interceptions at run-time. However, an application will not see any difference with a standard JVM. The PROSE JVM also provides an API for inserting and removing extensions.

Conclusion

A method, computer software, and a computer system are each are described herein in the context of an aspect oriented web service invocation.

The framework can be extended to address separation of any other concerns in addition to mapping, SLA such as QOS. It is also highly adaptable.

Various alterations and modifications can be made to the techniques and arrangements described herein, as would be apparent to one skilled in the relevant art.

We claim:

1. A method for invoking a web service between a service requestor and a service provider, the method comprising the steps of:

a service requestor making a service request to a service intermediary that includes source tModel and target web service information; and a service intermediary:

retrieving a mapping aspect corresponding to said target web service information:

retrieving an access code structure;

performing runtime weaving of said mapping aspect into said access code structure; and invoking the requested service in a form including the target tModel.

2. The method of claim 1, further comprising the steps of: a service provider responding to said invocation by providing a response, said service intermediary performing reverse runtime weaving using a mapping aspect corresponding to said source tModel, and returning said response to said service requestor.

3. The method of claim 1, further comprising the step of said service intermediary also weaving an aspect relating to Service Level Agreement parameters into said access code structure.

4. The method of claim 1, wherein said mapping aspect includes pointcuts and corresponding advice relating to join points of said access code structure.

5. A web serving system comprising:
- at least one service requesting client, each said requesting client having a source tModel and specifying target web service information;
- a web service intermediary including an aspect library having a set of mapping aspects each relating to services provided by servers, an access client component, and a runtime weaving tool;
- a plurality of servers providing web services; and
- a communications network connecting said requesting clients with said intermediary, and said intermediary with said servers;
- and wherein said aspect library matches the target web service information with one said web service servers and provides a matching target tModel mapping aspect to said access client, to be woven into an aspect of said access client and instantiated in a binding template at runtime by said weaving tool to invoke the requested service.

6. The system of claim 5, further comprising an aspect factory containing templates relating to Service Level Agreement parameters, and wherein said aspect factory outputs an aspect corresponding to a set of SLA parameters specified by a service requesting client to said access client also to be woven with said mapping aspect and said access client aspect.

7. The web serving system of claim 5, wherein said mapping aspect includes pointcuts and corresponding advices relating to join points of said access client aspect.

8. A web service intermediary comprising:
- an aspect library having a set of mapping aspects each relating to services provided by servers;
- an access client component; and
- a runtime weaving tool;
- and wherein said aspect library matches target web service information with one said web service server and provides a matching target tModel mapping aspect to said access client, to be woven into an aspect of said access client and instantiated in a binding template at runtime by said weaving tool to invoke the requested service.

9. The web service intermediary of claim 8, further comprising an aspect factory containing templates relating to Service Level Agreement parameters, and wherein said aspect factory outputs an aspect corresponding to a set of SLA parameters specified by a service requesting client to said access client also to be woven with said mapping aspect and said access client aspect.

10. The web service intermediary of claim 8, wherein said mapping aspect includes point cuts and corresponding advices relating to join points of said access client aspect.

* * * * *